(12) United States Patent
Mueller et al.

(10) Patent No.: US 8,185,281 B2
(45) Date of Patent: May 22, 2012

(54) METHOD AND CONTROLLER FOR CONTROLLING A POWER TRAIN OF A VEHICLE

(75) Inventors: Jonas Mueller, Munich (DE); Thomas Christ, Munich (DE); Axel Poeltenstein, Unterhaching (DE); Jochen Hoenle, Munich (DE); Felix Lins, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 357 days.

(21) Appl. No.: 12/492,699

(22) Filed: Jun. 26, 2009

(65) Prior Publication Data

US 2010/0332070 A1 Dec. 30, 2010

(51) Int. Cl.
*G06F 19/00* (2011.01)
(52) U.S. Cl. .................. 701/53; 701/1; 701/51; 701/58; 701/65
(58) Field of Classification Search ............... 701/51–79
See application file for complete search history.

(56) References Cited

U.S. PATENT DOCUMENTS

| | | | | |
|---|---|---|---|---|
| 4,601,369 A | * | 7/1986 | Hattori et al. | 192/3.58 |
| 4,714,144 A | * | 12/1987 | Speranza | 477/84 |
| 4,784,007 A | * | 11/1988 | Ishida et al. | 74/335 |
| 5,692,991 A | * | 12/1997 | Iwata et al. | 477/98 |
| 6,973,383 B2 | * | 12/2005 | Mitsutani et al. | 701/112 |
| 7,329,205 B2 | * | 2/2008 | Preisner et al. | 477/80 |
| 7,632,215 B2 | * | 12/2009 | Dourra et al. | 477/174 |
| 2004/0015285 A1 | * | 1/2004 | Mitsutani et al. | 701/101 |
| 2006/0122031 A1 | * | 6/2006 | Preisner et al. | 477/80 |
| 2008/0132375 A1 | * | 6/2008 | Dourra et al. | 475/271 |

* cited by examiner

*Primary Examiner* — Khoi Tran
*Assistant Examiner* — Bhavesh V Amin
(74) *Attorney, Agent, or Firm* — Crowell & Moring LLP

(57) ABSTRACT

A method and controller are provided for controlling a power train of a vehicle having a number of modes of operation. A first controller is provided for controlling of a first function of the vehicle. At least one second controller is provided for controlling of a second function of the vehicle. The first controller and the at least one second controller are combined in a joint controller having a state observer and a number of controlling entities. The joint controller is operated by a set of formal controlling parameters assigned to the controlling entities. Actual parameters of the set of formal controlling parameters are switched according to a current mode of the number of modes of operation.

16 Claims, 1 Drawing Sheet

METHOD AND CONTROLLER FOR CONTROLLING A POWER TRAIN OF A VEHICLE

BACKGROUND AND SUMMARY OF THE INVENTION

The present invention relates to a method and a controller for controlling a power train of a vehicle having a number of modes of operation.

Different functions of a power train of a vehicle are represented by separate software modules. For instance, in a modern vehicle there are software modules for controlling an engine speed of a combustion engine, a module for controlling an active damping of the power train, a module for controlling start and stop of the combustion engine, and a module for controlling a clutch of the power train. Combination of these software modules leads to a functional risk which has to be safeguarded, since the software modules have complex and sometimes unknown interactions with one another. A disadvantage of the interaction of the different software modules is the deceleration of the process of developing the power train since modifications on one software module might influence the function of another software module. Furthermore, with the increasing complexity of the software modules of a power train and the increasing number of the modules, insight into the overall system decreases. As a result, misbehavior of the whole system cannot be reduced to a specific part of the system.

Furthermore, since there is no communication between the different software modules of the power train (sometimes referred to as a system), some of these modules may need redundant information for providing the same functionality. Because of the presence of many non-linear characteristic curves, an analysis of stability of the whole power train is difficult to achieve. Although it is possible to linearize parts of the whole system, this is extensive work and for the verification of stability not necessarily sufficient.

It is therefore an object of the present invention to provide a method and a controller for controlling a power train of a vehicle to obviate and mitigate the afore-mentioned disadvantages.

According to the invention, a method for controlling a power train of a vehicle having a number of modes of operation is provided. The method comprises the steps of providing a first controller for controlling of a first function of the vehicle; providing at least one second controller for controlling of a second function of the vehicle; combining the first controller and the at least one second controller in a joint controller having a state observer and a number of controlling entities, the joint controller being operated by a set of formal controlling parameters assigned to the controlling entities; and switching actual parameters of the set of formal controlling parameters according to a current mode of the number of modes of operation.

In accordance with another aspect of the invention, a controller for controlling a power train of the vehicle having a number of modes of operation is provided. The controller comprises a first controller for controlling a first function of the vehicle; at least one second controller for controlling of a second function of the vehicle; and a joint controller combining the first controller and the at least one second controller, the joint controller having a state observer and a number of controlling entities and being operated by a set of formal controlling parameters assigned to the controlling entities. The joint controller is adapted to switch actual parameters of the set of formal controlling parameters according to the current mode of the number of modes of operation.

Other objects, features and characteristics of the present invention, as well as the methods of operation and the function of the related elements of the structure and the combination of parts, will become more apparent upon consideration of the following detailed description and appended claims with reference to the accompanying drawings, all of which form part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE DRAWINGS

Figure 1:
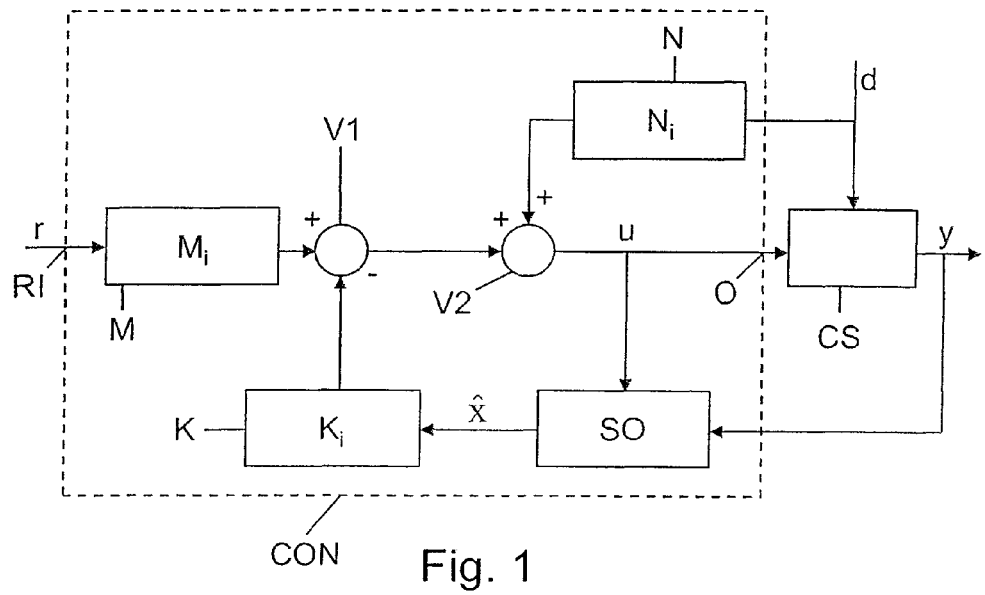
FIG. 1 is a schematic diagram of a joint controller according to an embodiment of the invention.

With reference to FIG. 1, the controller CON includes a state observer SO and a number of controlling entities $M_i$ and $K_i$. The controller CON is interconnected with a controlled system CS. The controlled system CS represents a power train of a vehicle having a number of modes of operation. The vehicle may be a hybrid vehicle including a combustion engine and at least one electric motor. The joint controller CON combines the functionality of a first controller for controlling of a first function of the vehicle and at least one second controller for controlling of a second function of the vehicle. The first controller may control the start and stop procedure of the combustion engine of the vehicle. The at least one second controller may control an active damping of the power train, an engine speed of the combustion engine, and a clutch of the power train.

At an output of the controlled system CS a number of measured variables y of the controlled system CS is fed to a first input of the state observer SO. A number of controlling variables u is fed to the controlled system CS and a second input of the state observer SO. As in an actual system, a disturbance variable d influences the behavior of the controlled system CS and is, therefore, fed to the state observer SO, too. The controlled system can be realized as a Multi Input Multi Output (MIMO) system, for example.

At a reference input RI of the controller CON, a reference signal r will be filtered with the help of a first main controlling parameter $M_i$ of the first controlling entity M. The filtered reference signal r will be compared by an element V1 with a system status variable $\hat{x}$ which is output by the state observer SO and amplified by a second main controlling parameter $K_i$ of the second controlling entity K. As a result of this comparison, a controlling error is impinged with a disturbance parameter $N_i$ of disturbing entity N representing the disturbance variable d. The disturbance parameter $N_i$ includes among others a piston momentum of the combustion engine during its start procedure. The output of element V2 corresponds to the controlling variable u which is fed to the controlled system CS and the state observer SO.

The joint controller CON illustrated in FIG. 1 is defined by the following system equations:

$$x \in \Re^n$$

$$\hat{x} \in \Re^n$$

$$u \in \Re^m$$

$y \in \mathfrak{R}^o$ $d \in \mathfrak{R}^p$ $A \in \mathfrak{R}^{n*n}$ $B \in \mathfrak{R}^{n*m}$ $C \in \mathfrak{R}^{o*n}$ $K \in \mathfrak{R}^{n*n}$ $M \in \mathfrak{R}^{n*n}$ $N \in \mathfrak{R}^{n*p}$, wherein x, x̂, u, y and d are variables as described above, and wherein A represents a system matrix, B represents an input matrix, C represents an output matrix relating to the measured signals of the system CS, K represents a state return matrix, M represents a filter matrix, and N represents a disturbance gain matrix.

The controlled system CS of FIG. 1 is described by the following equations:

$$S \begin{cases} x_{k+1} = A_i x_k + B_i u_k + E_i d_k + L_i(y - y_m) \\ y_k = C_i x_k. \end{cases} \quad (1)$$

The control law is defined by:

$$u_k = M_i r_k - K_i \hat{x}_k + N_i d_k \quad (2).$$

The subscript i characterizes a current mode of operations of the vehicle and the power train, respectively. As a first mode of operation, a process of starting or stopping the combustion engine of the vehicle is defined. As a second mode of operation, driving in one of a number of gears is defined. The first mode of operation is indicated by the subscript "0". The second mode of operation is indicated by a subscript 1, 2, 3, . . . according to the used gear. According to the method, actual parameters of a set of formal controlling parameters, mainly $K_i$, $M_i$, $N_i$, for operating a joint controller are switched according to the current mode of the number of modes of operation. The switching between the different modes of operation therefore includes switching of actual parameters of the formal controlling parameters $K_i$, $M_i$ and $N_i$. The table below shows an overview over the configuration of the controller:

|  | Controller | | | State Observer | | | |
| --- | --- | --- | --- | --- | --- | --- | --- |
| Mode | $K_i$ | $M_i$ | $N_i$ | $A_i$ | $B_i$ | $C_i$ | $L_i$ |
| 0 | $(C_0 B_0)^{-1} C_0 A_0$ | 0 | $-(C_0 B_0)^{-1} C_0 E_0$ | $A_1$ | $B_1$ | $C_1$ | $L_1$ |
| 1 | $K_1$ | $M_1$ | 0 | $A_1$ | $B_1$ | $C_1$ | $L_1$ |
| 2 | $K_2$ | $M_2$ | 0 | $A_2$ | $B_2$ | $C_2$ | $L_2$ |
| 3 | . . . | | | . . . | | | |

In this table $A_0$, $B_0$, $C_0$ and $E_0$ represent matrices of the state observer SO of the joint controller CON. In case one of the main controlling parameters $K_i$, $M_i$ and the disturbance parameter $N_i$ corresponds to an actual parameter "0", it is to be interpreted as column vector with appropriate dimensions. It is to be noted that the dimension of C can always be chosen in such a way that CB remains invertible.

Below, the actual parameters of the first and second main parameter and the disturbance parameter will be deduced. During the start of the combustion engine of the vehicle there is a demand for speed and momentum neutrality. This neutrality may be constituted by the choice of the state corresponding to $C_0 x_k = r \forall k$. Therefore, the following condition is valid:

$$x_k \in S \subset \mathfrak{R}^n \forall k.$$

A disturbance by the disturbance variable $d_k$ would result in x leaving S. By appropriate choice of $u_k$, a compensation can be made, such that $x_{k+1}$ remains in S. Therefore, the following equation according to equation (1) is valid:

$$C_0(A_0 x_k + B_0 u_k + E_0 d_k) = r$$

$$C_0 B_0 u_k = r - C_0 A_0 x_k - C_0 E_0 d_k$$

$$u_k = (C_0 B_0)^{-1} r - (C_0 B_0)^{-1} C_0 A_0 x_k - (C_0 B_0)^{-1} C_0 E_0 d_k$$

In accordance with equation (2) $M_0$, $K_0$ and $N_0$ can be determined:

$$M_0 = (C_0 B_0)^{-1}$$

$$K_0 = (C_0 B_0)^{-1} C_0 A_0$$

$$N_0 = -(C_0 B_0)^{-1} C_0 E_0$$

As a result, the damping of an impulse during the start procedure of the combustion engine is a specific case of an already existing controller. It is to be noted that for isostatic systems $C_0 \in \mathfrak{R}^{2*n}$ and therefore u can be determined from equations (1) and (2) only if $u \in \mathfrak{R}^m$: $m \leq 2$. For systems being statistic over-determined $C_0$ can be expanded by equations of deformation analysis to determine u.

Figure 2:
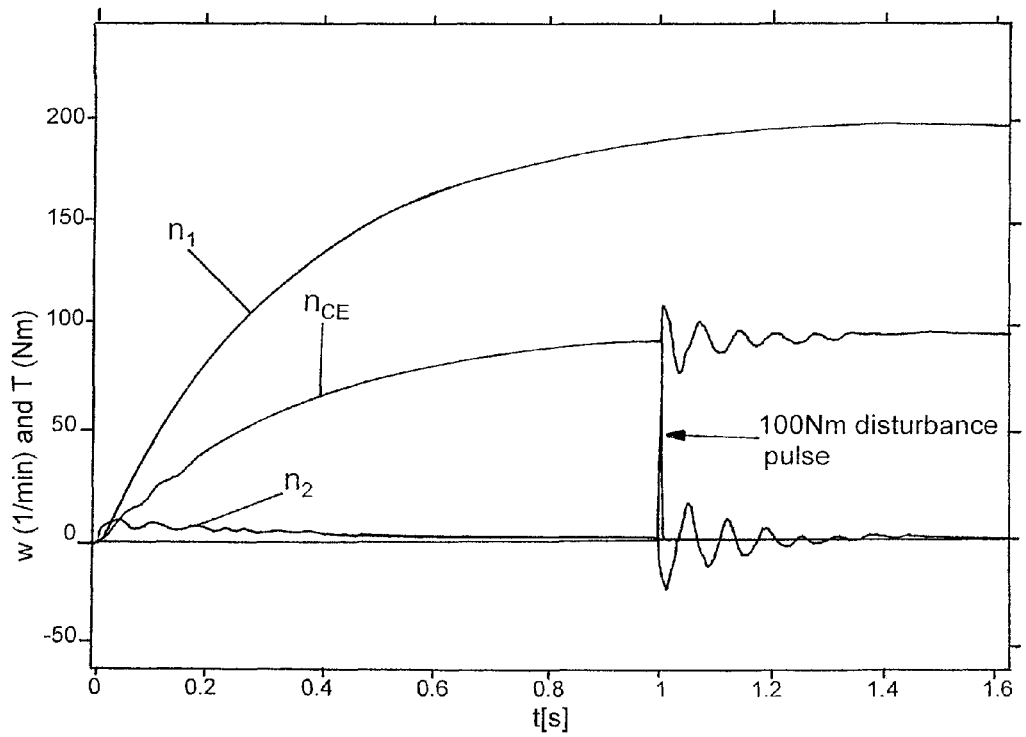
FIG. 2 is a diagram showing a simulation for determining the performance of the controller.

The performance of the joint controller can be identified with the help of an impulse disturbance. FIG. 2 shows a simulation for determining the quality of the joint controller. The diagram shows the speed W and momentum T of the power train of a hybrid vehicle over time. With $n_1$ and $n_2$, the speed of two electric motors 1 and 2 of the hybrid vehicle is denoted. $n_{CE}$ illustrates the speed of the combustion engine. At t=1 sec a disturbance pulse of 100 Nm is provided. As can be seen from the diagram, the modification of the speed $n_{CE}$ of the combustion engine is controlled very fast to its target state. The controlling is done by varying the speed $n_2$ of the second electric motor.

The method and controller integrate a mechanism for damping an impulse during the start procedure of the combustion engine as well as the control of its speed and the control of a clutch in the existing controlling structure. Therefore, synergistic effects can be obtained with the help of a joint controller with regard to estimating and managing state variables of the power train of the vehicle.

One advantage is that controlling of the speed of the combustion engine takes place only in one module. Therefore, interactions between different modules can be prevented.

Furthermore, it is possible to linearize the system and therefore to perform theoretic analysis of the stability of the whole system without further effort. It is possible to use stabilizing criteria for linear systems like Nyquist, Bode, Root-Locus, etc.

The reduced complexity of the controller allows releasing of hardware resources like computing time and memory. In currents systems, these resources are needed for the separate controllers.

Last, redundant inputs can be calculated automatically in the joint controller from the system equations. Therefore, efforts for application and potential mistakes can be reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a power train of a vehicle having a number of modes of operation, the method comprising the acts of:
   providing a first controller for controlling of a first function of the vehicle;
   providing at least one second controller for controlling of a second function of the vehicle;
   combining the first controller and the at least one second controller in a joint controller having a state observer and a number of controlling entities, the joint controller being operated by a set of formal controlling parameters assigned to the controlling entities, wherein the set of formal controlling parameters comprises a first main controlling parameter; and
   switching actual parameters of the set of formal controlling parameters according to a current mode of the number of modes of operation, wherein the actual parameter of the first main controlling parameter, during a first mode of operation of the number of modes of operation, corresponds to one of $(C_0 B_0)^{-1} C_0 A_0$ or $-(C_0 B_0)^{-1} C_0 E_0$, where $A_0$, $B_0$ and $C_0$ are matrices of the state observer of the joint controller.

2. The method according to claim 1, wherein the number of modes of operation comprises, as the first mode of operation, the process of starting or stopping of a combustion engine of the vehicle and, as a second mode of operation, driving in one of a number of gears, wherein the actual parameters of the set of formal controlling parameters of the first mode of operation are set different from those actual parameters of the set of formal controlling parameters of the second mode of operation.

3. The method according to claim 1, wherein the set of formal controlling parameters further comprises a second main controlling parameter, and a disturbance parameter.

4. The method according to claim 3, wherein the actual parameter of the second main parameter during the first mode of operation corresponds to 0.

5. The method according to claim 1, wherein the first controller controls start and stop of the combustion engine.

6. The method according to claim 1, wherein the second controller controls an active damping of the power train.

7. The method according to claim 1, wherein the second controller controls an engine speed of the combustion engine.

8. The method according to claim 1, wherein the second controller controls a clutch of the power train.

9. A controller for controlling a power train of a vehicle having a number of modes of operation, comprising:
   a first controller for controlling of a first function of the vehicle;
   at least one second controller for controlling of a second function of the vehicle; and
   a joint controller combining the first controller and the at least one second controller, the joint controller having a state observer and a number of controlling entities and being operated by a set of formal controlling parameters assigned to the controlling entities, the set of formal controlling parameters comprising at least a first main controlling parameter, the joint controller being adapted to switch actual parameters of the set of formal controlling parameters according to a current mode of the number of modes of operation, wherein the actual parameter of the first main controlling parameter, during a first mode of operation of the number of modes of operation, corresponds to one of $(C_0 B_0)^{-1} C_0 A_0$ or $-(C_0 B_0)^{-1} C_0 E_0$, where $A_0$, $B_0$ and $C_0$ are matrices of the state observer of the joint controller.

10. The controller according to claim 9, wherein the controller is adapted to provide the number of modes of operation, and wherein the number of modes comprises, as the first mode of operation, the process of starting or stopping of a combustion engine of the vehicle and as a second mode of operation, driving in one of a number of gears, wherein the actual parameters of the set of formal controlling parameters of the first mode of operation are different from those actual parameters of the set of formal controlling parameters of said second mode of operation.

11. The controller according to claim 9, wherein the set of formal parameters further comprises a second main controlling parameter, and a disturbance parameter.

12. The controller according to claim 11, wherein the actual parameter of the second main parameter during the first mode of operation corresponds to 0.

13. The method according to claim 9, wherein the first controller is adapted for controlling the start and stop of the combustion engine.

14. The method according to claim 9, wherein the second controller is adapted for controlling an active damping of the power train.

15. The method according to claim 9, wherein the second controller is adapted for controlling an engine speed of the combustion engine.

16. The method according to claim 9, wherein the second controller is adapted for controlling a clutch of the power train.

* * * * *